United States Patent
Chodnekar et al.

[11] 3,812,262
[45] May 21, 1974

[54] SUBSTITUTED PROPIOLOPHENONES USED AS PLANT FUNGICIDES

[75] Inventors: Madhukar S. Chodnekar, Basel; Hans Thommen, Therwil; Ulrich Schwieter, Reinach, all of Switzerland

[73] Assignee: Hoffmann-La Roche Inc., Nutley, N.J.

[22] Filed: Mar. 27, 1972

[21] Appl. No.: 238,533

Related U.S. Application Data

[62] Division of Ser. No. 87,316, Nov. 5, 1970, Pat. No. 3,705,177.

[30] Foreign Application Priority Data
Nov. 14, 1969 Switzerland............... 16957/69

[52] U.S. Cl.................. 424/282, 424/278, 424/331
[51] Int. Cl............................. A01n 9/24, A01n 9/28
[58] Field of Search............... 424/278, 282, 331; 260/340.3, 340.5, 592

[56] References Cited
UNITED STATES PATENTS
3,340,300    9/1967    Safir et al. .................. 260/592 X
3,705,177   12/1972   Chodnekar et al. ........... 260/340.3

*Primary Examiner*—Albert T. Meyers
*Assistant Examiner*—Leonard Schenkman
*Attorney, Agent, or Firm*—Samuel L. Welt; Jon S. Saxe; R. Hain Swope

[57] ABSTRACT

Compounds represented by the formula

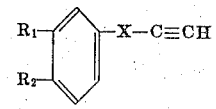

wherein one of $R_1$ and $R_2$ represents a member selected from the group consisting of hydrogen, halogen, hydroxy, lower alkyl, lower alkoxy or propynyloxy and the other represents a member selected from the group consisting of halogen, hydroxy, lower alkyl, lower alkoxy or propynyloxy or $R_1$ and $R_2$ together represent a lower alkylenedioxy group, X is a member selected from the group consisting of

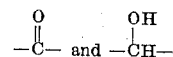

are used for combatting plant fungi, nematodes and insects.

6 Claims, No Drawings

SUBSTITUTED PROPIOLOPHENONES USED AS PLANT FUNGICIDES

This is a division, of application Ser. No. 87,316 filed Nov. 5, 1970, now U.S. Pat. No. 3,705,177.

BRIEF SUMMARY OF THE INVENTION

The present invention relates to compositions containing acetylene compounds useful in combatting plant fungi and/or pests. The present invention also relates to methods of combatting plant fungi and/or pests utilizing one or more acetylene compounds represented by the formula

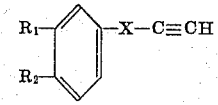

I.

wherein one of $R_1$ and $R_2$ represents a member selected from the group consisting of hydrogen, halogen, hydroxy, lower alkyl, lower alkoxy or propynyloxy and the other represents a member selected from the group consisting of halogen, hydroxy, lower alkyl, lower alkoxy or propynyloxy or $R_1$ and $R_2$ together represent a lower alkylenedioxy group, and X is a member selected from the group consisting of

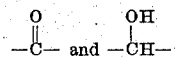

The present invention relates to novel acetylene compounds as hereinafter described.

DETAILED DESCRIPTION OF THE INVENTION

The compounds active in the compositions of the present invention are represented by the formula

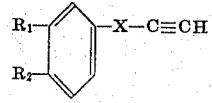

wherein one of $R_1$ and $R_2$ represents a member selected from the group consisting of hydrogen, halogen, hydroxy, lower alkyl, lower alkoxy or propynyloxy and the other represents a member selected from the group consisting of halogen, hydroxy, lower alkyl, lower alkoxy or propynyloxy or $R_1$ and $R_2$ together represent a lower alkylenedioxy group and X is a member selected from the group consisting of

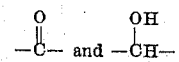

Preferred among the active compounds of the present invention are compounds represented by formula I wherein each of $R_1$ and and $R_2$ is selected from the group consisting of halogen, hydroxy, lower alkyl and lower alkoxy or $R_1$ and $R_2$ together are a lower alkylenedioxy group. Especially preferred are those compounds of the above formula I wherein $R_1$ and $R_2$ are each alkoxy groups containing from one to three carbon atoms or $R_1$ and $R_2$ together are a lower alkylenedioxy group, preferably containing from one to three carbon atoms in the alkylene chain.

Examples of the preferred active compounds of the present invention wherein "X" in formula I is

i.e., compounds of the formula

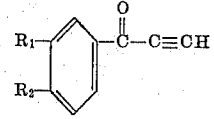

wherein $R_1$ and $R_2$ have the meaning given in formula I are:

3',4'-(methylenedioxy)-propiolophenone,
1-(1,4-benzodioxan-6-yl)-2-propyn-1-one,
1-(3,4-dihydro-2H-1,5-benzodioxepin-7-yl)-2-propyn-1-one,
3',4'-dimethoxypropiolophenone,
3'-methoxy-4'-hydroxy-propiolophenone,
3',4'-dichloropropiolophenone,
4'-chloropropiolophenone,
4'-methoxypropiolophenone and
4'-propynyloxypropiolophenone.

Examples of the preferred active compounds of the present invention wherein "X" in formula I is

i.e., compounds of the formula

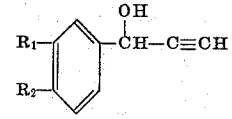

wherein $R_1$ and $R_2$ have the meaning given above are:

α-ethynylpiperonyl alcohol
α-ethynyl-1,4-benzodioxan-6-methanol
α-ethynyl-3,4-dihydro-2H-1,5-benzodioxepine-7-methanol.

Certain of the compounds represented by formula I are novel compounds. These compounds wherein "X" is

are represented by the formula

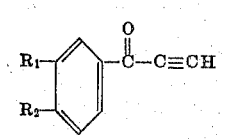

wherein one of $R_1$ and $R_2$ is selected from the group consisting of hydrogen, halogen and propynyloxy and the other is selected from the group consisting of halogen and propynyloxy or $R_1$ and $R_2$ together are a lower alkylenedioxy group.

Novel compounds of the formula I wherein "X" is

are represented by the formula

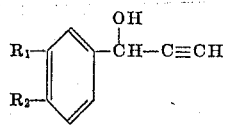

wherein one of $R_1$ and $R_2$ is selected from the group consisting of hydrogen and pro-pynyloxy and the other is propynyloxy or $R_1$ and $R_2$ together are a lower alkylenedioxy group containing from two to six carbon atoms.

Unless expressly stated otherwise, the term "lower alkyl" as utilized herein indicates both straight chain and branched chain alkyl groups containing up to six carbon atoms, and preferably up to three carbon atoms. Examples of such groups include, for instance, methyl, ethyl, isopropyl, butyl, tert-butyl, pentyl and hexyl groups. The term "lower alkoxy" as utilized herein indicates alkoxy groups of which the alkyl portion is the same as defined for lower alkyl above. Preferred alkoxy groups include, for instance, methoxy, ethoxy and isopropoxy groups. The term "lower alkylenedioxy" as utilized herein represents groups of the formula $-O-(CH_2)_n-O-$ in which $n$ stands for an integer of from one to six, preferably from one to three. The term "halogen" as utilized herein includes all four halogens, i.e., fluorine, chlorine, bromine and iodine. Of these, chlorine is particularly preferred.

The acetylenic alcohols of the present invention, i.e., those compounds represented by formula I wherein "X" is

may be prepared from the corresponding aldehyde, i.e., a compound of the formula

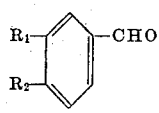

wherein $R_1$ and $R_2$ have the meaning given in formula I.

Such aldehyde is reacted with an alkali metal acetylide or, alternately, an acetylene Grignard compound.

The reaction of an aldehyde of the above formula with an alkali metal acetylide, preferably sodium acetylide is expediently carried out utilizing liquid ammonia as the reaction solvent. It is particularly expedient to carry out this reaction at the reflux temperature of the reaction mixture with the pressure not being critical. Expediently, an alkali metal amide is initially prepared in situ, acetylene gas is then conducted into the mixture, and after the necessary amount of alkali metal acetylide has been formed, the aldehyde of the above formula is then added dropwise as a solution in a suitable inert organic solvent, preferably diethyl ether.

The acetylene Grignard compound which can be utilized in the formation of the acetylenic alcohols of the invention is prepared in the usual manner known in the art. The reaction of the aldehyde compound with the acetylene Grignard is carried out in a suitable inert organic solvent, preferably diethyl ether or tegrahydrofuran, expediently under a protecting atmosphere such as, for example, nitrogen gas. A preferred temperature range for carrying out this reaction lies between room temperature and the boiling point of the reaction mixture. Pressure is not a critical factor in the reaction.

The acetylenic compounds represented by formula I wherein "X" is

can be prepared by either of two alternate methods. In one such method the corresponding alcohols, i.e., the compounds represented by formula I wherein "X" is

are treated with an oxidizing agent. In the alternate method, an acid halide of the formula

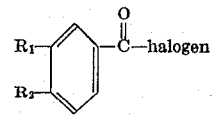

wherein $R_1$ and $R_2$ have the meaning given in formula I is reacted with a metal acetylide.

In the oxidation method, the preferred oxidizing agents are manganese dioxide, chromium trioxide and chromium trioxide in concentrated sulfuric acid. Of these, manganese dioxide is most preferred. The oxidation reaction is carried out in a suitable inert organic solvent such as, for example, ethers such as diethyl ether and tetrahydrofuran, hydrocarbons such as benzene, toluene, xylene and petroleum ether as well as the chlorinated hydrocarbons. A particularly preferred solvent is dichloromethane. The temperatures and pressures at which the oxidation reaction is carried out are not particularly critical. It is preferred, however, to carry out the oxidation reaction at a temperature between 0°C. and the boiling point of the reaction mixture, room temperature being especially preferred. In general, the reaction is carried out by stirring or shaking the reaction mixture under atmospheric pressure for from about 1 to 12 hours at room temperature.

In the alternate method, the acid halides of the above formula are reacted with a metal acetylide, preferably silver acetylide, in an inert organic solvent, preferably carbon tetrachloride, chloroform or benzene. A preferred reaction temperature is the reflux temperature of the reaction mixture. The preparation of the silver acetylide is effected under conditions described in J. Am. Chem. Soc. 78, 1675 (1956).

The compounds represented by formula I are particularly suitable for the inhibition of the growth of plant fungi. The antifungal activity of these compounds remains undiminished over a long period of time and is substantially free from undesirable properties. In addition, the active compounds of the present invention also possess a juvenile hormone-like activity and may, therefore, also be used simultaneously as pesticides.

Antifungal compositions of the present invention which contain as active ingredients one or more of the compounds represented by formula I are capable of effectively inhibiting the growth of plant fungi on leaves and fruits of an infected plant caused by such fungi as, for example, Phytophthora infestans which is responsible for leaf and tuber blight of potatoes. Further, the compositions of the invention are useful in combatting Tiletia diseases caused by, for example, Botrytis cinerea, Corticium rolfsii, Tilletai tritici, Fusarium nivale, Erysiphe cichoracearum, Piricularia orycae, Venturia inaequalis, Puccinia coronata and Peronospora viticola. The compositions are also active against algae such as, for example, the *Scenedesmus*, *Ocillatoria* and *Chlorella* species. At the same time, the compositions are particularly advantageous in that the growth of plants treated with them is not substantially affected. Also, no disadvantageous effects have been observed with harvested fruits from plants which have been treated with such compositions. In most cases, plants treated with compositions of the present invention have been observed to display abundant, vigorous growth.

The antifungal compositions of the present invention are prepared and applied by methods customary in the art. The active ingredient, i.e., one or more of the acetylene compounds represented by formula I, can be dissolved in suitable solvents, converted into emulsions or dispersions or applied in suitable carrier substances. In addition to suitable inert dispersing agents recognized in the art, the spectrum of activity of the compositions of the present invention can be increased by the addition of compatible insecticidal, acaricidal, bactericidal and/or fungicidal compounds. As examples of such active agents there may be mentioned 0,0-dimethyl-S-(1,2-dicarbethoxyethyl)-dithiophosphate, 0,0-diethyl-0-(p-nitrophenyl)-thiophosphate, γ-hexachlorocyclohexane, 2,2-bis(p-ethylphenyl)-1,1-dichloroethane, p-chlorobenzyl p-chlorophenyl sulfide, 2,2-bis (p-chlorophenyl)-1,1,1-trichloroethanol, zinc ethylene-bisdithiocarbamate, N-trichloromethyl-thio-tetrahydrophthalimide, sulfur and the like.

It is most common in the antifungal art for compositions to be applied in the form of a powder as by dusting of crops. In the manufacture of the compositions of this invention in dry form there can be used various pulverulent carrier materials such as, for example, kaolin, bentonite, talcum, whiting, magnesium carbonate, Kieselgel and the like. The active ingredient can be mixed with such carrier materials, for example, by milling them together, or the carrier material can be impregnated with a solution of the active ingredient after which the solvent is removed by evaporation, heating or by removing under reduced pressure. Such pulverulent compositions can be applied to the plants to be protected as dusts with the aid of usual dusting equipment known to the art. The pulverulent compositions can be made easily wettable with water by the addition of conventional wetting and/or dispersing agents so that they can also be applied by spraying in the form of aqueous suspensions.

The compositions of the present invention may further be manufactured in the form of emulsifiable concentrates utilizing the active ingredients in the form of their water soluble salts or in certain instances the free base where it is water soluble. These soluble forms can be mixed with suitable emulsifying agents or dissolved in an inert solvent and mixed with a suitale emulsifier. In use, these concentrates are diluted with water to obtain a sprayable preparation.

For normal agricultural usage compositions containing the active ingredients of the present invention in a concentration of from 0.05 percent to about 0.6 percent by weight, preferably from about 0.1 percent to about 0.5 percent by weight and most preferably from about 0.1 percent to about 0.25 percent by weight. Such compositions are usually applied in amounts of about 20 to 200 gallons of liquid or 20 to 200 pounds of dusting powder per acre, or any amount which proves to be effective to control the particular fungus to be combatted under the particular conditions at hand.

The compounds represented by formula I can also be utilized as pesticides. Most pesticides recognized in the art today are effective by killing, crippling or driving away pests as contact and/or feed poisons. In contrast to the action of such prior art pesticides, the compounds represented by formula I act by interferring with the hormonal system of the animal organism. The compounds act by disturbing the transformation to the image, the laying of viable eggs and the development of laid normal eggs. These effects interrupt the sequence of generations therefore killing the animals. The active compounds useful in the present invention have little toxicity for vertebrate animals. In this regard, the toxicity of the compounds represented by formula I is over 300 mg./kg. of body weight. Even more important, the compounds are not accumulated in the body as other known pesticies are, since they are readily degraded by the body.

The compounds represented by formula I are especially suitable for combatting invertebrate animals, especially arthropods and nematodes and particulary insects such as, for example, *Tenebrio molitor*, *Tineola biselliella*, *Carpocapsa pomonella*, *Leptinotarsa decemlineata*, *Calandra granaria*, *Dysdercus cingulatus* and *Ephestia kuhniella*.

In utilizing the active ingredients according to the present invention as pest-control agents, compositions can be formulated in the form of emulsions, suspensions, dusting powders, solutions or aerosols. In the concentrated form, such preparations can contain up to 80 percent of the active ingredient. These preparations are diluted prior to use so that the resulting composition which is sprayed or dusted has a concentration of active ingredient of from about 0.05 percent to about 1.0 percent by weight, preferably from about 0.1 percent to about 0.7 percent by weight and most preferably from about 0.1 percent to about 0.5 percent by weight. Such compositions are applied in a sufficient quantity to effect pesticidal activity. The amount of active ingredients required to achieve the desired effect will vary due to the type of pest being combatted, the environment and the like. For example, when treating textile materials to kill moth eggs and embryos a concentration of from about $10^{-3}$ to about $10^{-6}$ g/cm$^2$ of material is sufficient to insure the desired effect.

The following examples illustrate the invention. All temperatures are in degrees Centigrade.

For simplicity and convenience, the compounds of the present invention set forth in Examples 1 through 4 are designated by capital letters as follows:

A — 3',4'-dimethoxypropiolophenone

B — 3',4'-(methylenedioxy)-propiolophenone

C — 1-(1,4-benzodioxan-6-yl)-2-propyn-1-one

D — 1-(3,4-dihydro-2H-1,5-benzodioxepin-7-yl)-2-propyn-1-one

E — α-ethynylpiperonyl alcohol
F — α-ethynyl-1,4-benzodioxan-6-methanol
g — α-ethynyl-3,4-dihydro-2H-1,5-benzodioxepine-7-methanol

EXAMPLE 1

This example consists of a laboratory trail utilizing tomatoes of the variety Marmanda. The plant was sprayed in the 3- to 5- leaf stage with an aqueous suspension of the active substance to be tested in such a manner so that the plant surface shows an unbroken spray covering. Twenty-four hours after application of active substance, the plants were brought into a climatized, lighted chamber and infected with the fungus *Phytophthora infestans*.

The plants were incubated at temperatures of 10°–12° for 1 day, 17° the following day, and 21° for three subsequent days, after which the leaf surface destroyed by the fungus was assessed. The results are summarized in Table I. In the case of untreated controls, the protective action was 0 percent. In this test the standard for anti-fungal action was the compound manganese ethylene bisdithiocarbamate.

Table I

| Active test substance | Concentration in PPM | Protective action in % | Classification* |
|---|---|---|---|
| A | 500 | 99.6 | + + + + |
|   | 50 | 95.0 | |
| B | 500 | 92 | + + + + |
|   | 50 | 50 | |
| C | 500 | 100 | + + + + |
|   | 50 | 92 | |
| D | 500 | 95 | + + + + |
|   | 50 | 55 | |
| Standard** | 500 | 100 | + + + |
|   | 50 | 11 | |

*The classification reflects the activity of corresponding compounds over the whole concentration range between 500 and 50 parts per million. The designation ++++ represents optimum activity, +++ represents pronounced activity.
**Standard = manganese ethylene bisdithiocarbamate.

EXAMPLE 2

A laboratory trail was conducted with the test plants of the variety *Vicia faba* which were treated with active substance or standard in the manner described in Example 1. The test fungus used was *Botrytis cinerea*. The results of these test are summarized in Table II. The standard utilized in this experiment was N-1,1,2,2-trtrachloroethylmercapto-4-cyclohexene-1,2-dicarboximide. In the case of untreated controls, the protective action was 0 percent.

Table II

| Active Substance | Concentration in % | Protective Action in % |
|---|---|---|
| A | 0.10 | 99 |
| C | 0.10 | 99 |
|   | 0.03 | 99 |
|   | 0.01 | 84 |
| D | 0.10 | 96 |
| Standard* | 0.10 | 98 |
|   | 0.01 | 43 |

*N-1,1,2,2-tetrachloroethylmercapto-4-cyclohexene-1,2-dicarboximide.

EXAMPLE 3

This example dscribes a field trial utilizing potatoes of the variety Bintje, Inland A. The active substance for this experiment, substance C, was formulated according to conventional practice into a 25 percent by weight spray powder. The powder thus formed was suspended in water in a concentration of 2 kg. per 100 liters of water. 100 Liters of this aqueous suspension is sufficient for the treatment of a plot of 1,000 sq. meters. The spraying agent was sprayed over the potatoe culture in such a way as to uniformly coat the whole surface of all heads as completely as possible.

The first treatment of a plant was effected at the time when the leaves of the head began to touch in the rows. The plants were subsequently sprayed three more times at intervals of 8 to 10 days followed by a final treatment after 3 weeks. The entire field was infected 3 days after the third spray treatment with zoospores of *Phytophthora infestans* and subsequently watered for five successive days.

The treatment as outlined above was sufficient to essentially protect all or both ground plant parts against leaf light and all underground plant parts (tubers) against tuber blight.

A comparative test showed that to achieve the same protection as was realized with from about 400 to about 600 g. of active substance C, approximately 2 kgs. of the standard active substance N-1,1,2,2-tetrachloroethylmercapto-4-cyclohexene-1,2-dicarboximide were required.

EXAMPLE 4

This example illustrates the ovicidal action of the active substances of the present invention against *Ephestia kuhniella* (meal moth). Roundels (10 cm$^2$) of cotton material were drenched with a solution of the active substance of the present invention dissolved with acetone and cautiously dried. On each test roundel were placed from 30 to 60 freshly laid eggs of the meal moth. These eggs were brought to hatching in a small cage of plastic material maintained at 25° and high humidity. The action of the active substance manifests itself by an earlier or later death of the embryo either in the egg or upon hatching.

The results are expressed in percent mortality. The dosage is stated in 10$^{-x}$ g. of active substance per cm$^2$ of test material.

| Active Substance | Concentration 10$^{-x}$ g. of Active Substance | Egg Mortality in % |
|---|---|---|
| B | 3 | 100 |
| C | 4 | 100 |
|   | 5 | 100 |
| E | 4 | 100 |
| F | 4 | 100 |
| G | 3 | 82 |

EXAMPLE 5

1750.0 Ml. of liquid ammonia was introduced into a 6 liter three neck flask equipped with a stirrer and solid carbon dioxide cooling. The liquid ammonia was treated in portions with 35.0 g. of finely cut metallic sodium. The mixture was stirred for an hour and thereafter acetylene was introduced until the solution turned from blue to colorless (approximately 1 hour). A mixture of 150.0 g. of piperonal in 700.0 ml. of absolute ether was then added dropwise over a period of 1.5 hours, and stirring was continued for an additional hour after all had been added. After 300.0 g. of ammonium chloride had been added in small portions, the carbon dioxide cooling apparatus was removed and 1,000.0 ml. dichloromethane was added. The mixture was stirred overnight at room temperature and any slight residue of ammonia which was present was thereafter driven off by slight heating of the mixture. The mixture was then placed under a nitorgen atmosphere and 2,000.0 ml. of ice water was added. The chloromethane layer which separated was removed and washed once with a saturated salt solution and twice with water, dried over sodium sulphate and evaporated. The resulting solid residue was triturated with ether (approximately one part ether for three parts of residue) until crystallization occurred. The ether was then evaporated and the resulting residue combined with the crystalline mass. There was thus obtained α-ethynyl-piperonyl alcohol having a melting point of 39°–40°.

93.0 Grams of the α-ethynyl-piperonyl alcohol formed above were dissolved in 1,400.0 ml. of dichloromethane and 400.0 g. of manganese dioxide was added to the solution in portions. The reaction mixture was stirred overnight at room temperature, filtered and the filtrate evaporated. The residue was recrystallized from acetone to yield pure 3',4'-(methylenedioxy)-propiolophenone which has a melting point of 116°–117°.

EXAMPLE 6

1,700.0 Ml. of liquid ammonia was introduced into a 6 liter three neck flask equipped with a stirrer and solid carbon dioxide cooling. The liquid ammonia was treated in portions with 35.0 g. of finely cut metallic sodium. After addition was completed, the reaction mixture was stirred for 1 hour. Acetylene gas was then added to the solution until it became colorless. A mixture of 164.0 g. of 6-formyl-1,4-benzodioxan in 1,000.0 ml. of absolute ether was added dropwise over a period of 1.5 hours with stirring and the mixture was stirred for an additional hour after the addition had been completed. The reaction mixture was then treated with small portions of ammonium chloride to a total of 300.0 g. and the carbon dioxide cooling apparatus removed. 1,000.0 Ml. of dichloromethane was then added to the reaction mixture and the whole was stirred overnight. The following morning, the reaction mixture was slightly heated to drive off any residue of ammonia which might still be present. Under a nitrogen atmosphere, 2,000.0 ml. of ice water was then added dropwise to the mixture which was thereafter extracted with dichloromethane. The dichloromethane phase was separated and washed once with a saturated salt solution and once with water, dried over sodium sulphate and evaporated. The residue thus formed was chromatographed on Kieselgel (silicic acid gel); the elution was effected with dichloromethane containing 1 percent by weight methanol. The first fraction was discarded, the second fraction again chromatographed on Kieselgel, the elution being effected with a mixture of three parts ether to two parts petroleum ether. The first fraction contains α-ethynyl-1,4-benzodioxan-6-methanol.

720.0 Grams of $MnO_2$ was added in portions to 180.0 g. of the α-ethynyl-1,4-benzodioxan-6-methanol formed above dissolved in 2520.0 ml. of dichloromethane. The mixture was stirred overnight at room temperature, filtered, the filtrate evaporated and the residue recrystallized from acetone. There was thus obtained yellow crystals of 1-(1,4-benzodioxan-6-yl)-2-propyn-1-one, which melt at 116°–117°.

EXAMPLE 7

875.0 Ml. of liquid ammonia was introduced into a 4.5 liter three neck flask equipped with a stirrer and solid carbon dioxide cooling. The liquid ammonia was treated in portions with 17.5 g. of finely cut metallic sodium with stirring and the mixture was stirred for an hour after addition was completed. Acetylene gas was then conducted into the reaction mixture until it became colorless. A mixture of 89.0 g. of 7-formylbenzodioxepine in 350.0 ml. of absolute ether was added to the resulting solution dropwise with stirring over a period of 1.5 hours. After addition was completed, the mixture was stirred for 2 hours. 150.0 Grams of ammonium chloride was then added to this mixture in small portions and the carbon dioxide cooling apparatus was then removed. 500.0 Ml. of dichloromethane was then added and the mixture stirred overnight at room temperature. The next day the mixture was heated slightly to drive off any residual ammonia, placed under a nitrogen atmosphere and treated dropwise with 1,000.0 ml. of ice water. The mixture was then extracted with dichloromethane, washed once with a saturated salt solution, washed twice with water, dried over sodium sulphate and evaporated. The residue was chromatographed on Kieselgel with a mixture of nine parts benzene to one part methanol. α-Ethynyl-3,4-dihydro-2H-1,5-benzodioxepin-7-methanol was obtained as a light yellow oil.

140.0 Grams of manganese dioxide was addd in portions to a mixture of 35.0 g. of the α-ethynyl-3,4-dihydro-2H-1,5-benzodioxepin-7-methanol formed above dissolved in 500.0 ml. of chloroform. The mixture was stirred overnight at room temperature, filtered and the filtrate evaporated. The residue was recrystallized from acetone to obtain 1-(3,4-dihydro-2H-1,5-benzodioxepin-7-yl)- 2-propyn-1-one having a melting point of 86°–87°.

EXAMPLE 8

1,800.0 Ml. of liquid ammonia was introduced into a 6 liter three neck flask equipped with a stirrer and solid carbon dioxide cooling. The liquid ammonia was treated in portions with 34.0 g. of finely cut metallic sodium and the mixture was stirred for one hour. Acetylene gas was then conducted into the resulting solution until it became colorless. A solution of 175.0 g. of 3,4-dichlorobenzaldehyde in 400.0 ml. of ether was then added dropwise over a period of 1.5 hours. The resulting mixture was then stirred for an additional hour, and after 160.0 g. of ammonium chloride were added in small portions, the solid carbon dioxide cooling was removed. 1,500.0 Ml. of dichloromethane were added and the mixture was stirred overnight at room temperature. Any ammonia remaining in the mixture after it was stirred overnight was then driven off by slight heating. A total of 2,000.0 ml. of ice water was then added dropwise to the mixture under a nitrogen atmosphere. The resulting mixture was then extracted with dichloromethane. The dichloromethane extract was then washed neutral with water, dried over sodium sulphate and evaporated. The residue was chromatographed on Kieselgel using dichloromethane as the eluant. The third fraction contains 3',4'-dichloro-α-ethynylbenzyl alcohol which was then rechromatographed on Kieselgel with dichloromethane containing 3 percent methanol as the eluant. 22.5 Grams of manganese dioxide was added in portions to 6.7 g. of the 3′,4′-dichloro-α-ethynyl-benzyl alcohol formed above dissolved in 75.0 ml. of dichloromethane, stirred overnight at room temperature and filtered. The filtrate was evaporated and the residue chromatographed on Kieselgel with dichloromethane to yield 3′,4′-dichloropropiolophenone in the form of colorless crystals which melt at 97°–98°C.

EXAMPLE 9

900.0 Ml. of liquid ammonia was introduced into a 6 liter three neck flask equipped with a stirrer and solid carbon dioxide cooling. The liquid ammonia was treated in portions with 17.0 g. of finely cut metallic sodium and the mixture stirred for one hour. Acetylene gas was then conducted into the resulting solution until it became colorless. A solution of 70.0 g. of m-chlorobenzaldehyde in 200.0 ml. of absolute ether was then added dropwise over a period of 1.5 hours. The resulting mixture was then stirred for an additional hour, and after 80.0 g. of ammonium chloride were added in small portions, the solid carbon dioxide cooling was removed. 750.0 Ml. of dichloromethane was added and the mixture stirred overnight at room temperature. Any ammonia remaining in the mixture after it was stirred overnight was then driven off by slight heating. A total of 1,000.0 ml. of ice water was then added dropwise to the mixture under a nitrogen atmosphere. The residue was chromatographed on Kieselgel using a mixture of three parts dichloromethane to two parts petroleum ether as the eluant. The eluate was discarded and the column again eluted with dichloromethane. The second eluate was evaporated and the residue distilled to yield α-ethynyl-m-chlorobenzyl alcohol having a boiling point of 77°–79°C./0.01 Torr.

45.0 Grams of manganese dioxide were added in portions to a mixture of 10.0 g. of the α-ethynyl-m-chlorobenzyl alcohol formed above dissolved in 150.0 ml. of dichloromethane. The mixture was stirred overnight at room temperature, filtered and the filtrate evaporated. The residue was chromatographed on Kieselgel utilizing dichloromethane. The oil thus obtained was treated with an equal volume of petroleum ether and brought into solution by the addition of a few drops of ether. Upon cooling in an ice bath there was obtained colorless crystals of 3′-chloropropiolophenone having a melting point of 57°–58°C.

EXAMPLE 10

900.0 Ml. of liquid ammonia was introduced into a 2.5 liter three neck flask equipped with a stirrer and solid carbon dioxide cooling. The liquid ammonia was treated in portions with 17.0 g. of finely cut metallic sodium and the mixture was stirred for 1 hour. Acetylene gas was then conducted into the resulting solution until it became colorless. A solution of 70.0 g. of p-chlorobenzaldehyde in 500.0 ml. of absolute ether was then added dropwise over a period of 1.5 hours. The resulting mixture was then stirred for an additional hour, and after 80.0 g. of ammonium chloride was added in small portions, the solid carbon dioxide cooling was removed. 750.0 Ml. of dichloromethane was then added and the mixture stirred overnight. Any ammonia remaining in the mixture was then driven off by slight heating. 1,000.0 Ml. of ice water were added dropwise under a nitrogen atmosphere and the resulting mixture was extracted with dichloromethane. The dichloromethane extract was washed neutral with water, dried over sodium sulphate and evaporated. The residue was chromatographed on Kieselgel utilizing a mixture of equal parts of dichloromethane and petroleum ether and the eluate discarded. The column was eluted a second time with dichloromethane and the second eluate evaporated. Distillation of the resulting residue gives α-ethynyl-p-chloro-benzyl alcohol having a boiling point of 73°–74°/0.15 Torr.

75.0 Grams of manganese dioxide was added in portions to a solution of 16.6 g. of α-ethynyl-p-chlorobenzyl alcohol formed above dissolved in 250.0 ml. of dichloromethane, stirred overnight at room temperature and filtered. The filtrate was evaporated and the residue recrystallized from acetone to yield p-chloropropiolophenone in the form of colorless crystals having a melting point of 106°–107°.

EXAMPLE 11

400.0 Ml. of ammonia was condensed in a 1.5 liter three neck flask equipped with a stirrer and solid carbon dioxide cooling. 11.5 Grams of finely cut metallic sodium was added in portions to the ammonia and the mixture was stirred for half an hour. Acetylene gas was then conducted into the resulting solution until it became colorless. Thereafter, 64.0 g. of p-(2-propynyloxy)-benzaldehyde were added over a period of 1 hour. The resulting mixture was then stirred for an additional period of 4 hours after which 50.0 g. of ammonium chloride was added in small portions and the solid carbon dioxide cooling was removed. 300.0 Ml. of dichloromethane were added and the mixture stirred overnight at room temperature. Any ammonia remaining in the mixture after it was stirred overnight was then driven off by slight heating. The yellow solution thus obtained was washed five times with water, dried over sodium sulphate and evaporated. The residue was chromatographed on Kieselgel using a mixture of nine parts benzene to one part ether to yield α-ethynyl- p-(2-propynyloxy)-benzyl alcohol having a melting point from 60°–62°.

50.0 Grams of manganese dioxide was added in portions to a solution of 15.0 g. of the α-ethynyl-p-(2-propynyloxy)-benzyl alcohol formed above dissolved in 300.0 ml. of methylene chloride, stirred overnight at room temperature and evaporated. The filtrate was evaporated and the residue recrystallized from ethanol to yield 4′-(2-propynyloxy)-propiolophenone as yellow crystals having a melting point of 120°–122°.

EXAMPLE 12

This example relates to the preparation of (p-tolyl) ethynyl-carbinol which may be oxidized to p-methylpropiolophenone in the manner described in the preceding examples.

900.0 Ml. of ammonia was condensed in a 2.5 liter three neck flask equipped with stirring and solid carbon dioxde cooling. 17.0 Grams of finely cut metallic sodium was added in portions to this ammonia and the mixture was thereafter stirred for a period of 1 hour. Acetylene gas was then conducted into the resulting solution until it became colorless. A solution of 60.0 g. of p-toluyl aldehyde dissolved in 200.0 ml. of absolute ether was added dropwise over a period of 1.5 hours.

The resulting mixture was stirred for an additional hour after which 80.0 g. of ammonium chloride were added in small portions and the solid carbon dioxide cooling was removed. 750.0 Ml. of dichloromethane were than added, the mixture stirred overnight and any ammonia remaining in the mixture was then driven off by slight heating. The mixture was then treated dropwise with 1,000.0 ml. of ice water under a nitrogen atmosphere and the mixture extracted with dichloromethane. The dichloromethane extract was washed neutral with water, dried over sodium sulphate and evaporated. The residue was chromatographed on Kieselgel utilizing dichloromethane. The eluate was evaporated and the residue distilled in vacuum to yield (p-tolyl)-ethynyl-carbinol as a colorless liquid having a boiling point of 79°–80°/0.15 Torr.

We claim:

1. A fungicidal composition comprising an inert, compatible fungicide carrier material and from about 0.05 percent by weight to about 0.6 percent by weight 1-(1,4-benzodioxan-6-yl)-2-propyn-1-one.

2. A fungicidal composition comprising an inert compatible fungicide carrier material and from about 0.05 percent by weight to about 0.6 percent by weight 3',4'-(methylenedioxy)-propiolophenone.

3. A fungicidal composition comprising an inert compatible fungicide carrier material and from about 0.05 percent by weight to about 0.6 percent by weight 1-(3,4-dihydro-2H-1,5-benzodioxepin-7-yl)-2-propyn-1-one.

4. A method for controlling or preventing infestation of plants by plant fungi which comprises applying to said plants a fungicidally effective amount of a composition comprising an inert, compatible fungicide carrier material and from about 0.05 percent by weight to about 0.6 percent by weight of a compound represented by the formula

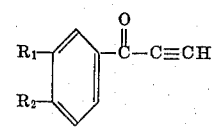

wherein one of $R_1$ and $R_2$ is selected from the group consisting of hydrogen, halogen, hydroxy, lower alkyl, lower alkoxy and propynloxy and the other is selected from the group consisting of halogen, hydroxy, lower alkyl, lower alkoxy and propynloxy or $R_1$ and $R_2$ taken together are a lower alkylenedioxy group.

5. The method of claim 4 wherein $R_1$ and $R_2$ are each alkoxy groups containing from one to three carbon atoms or $R_1$ and $R_2$ taken together are a lower alkylenedioxy group containing from one to three carbon atoms in the alkylene chain.

6. The method of claim 4 wherein said compound is 1-(1,4-benzodioxan-6-yl)-2-propyn-1-one.

* * * * *